Oct. 4, 1966  S. G. SYLVAN  3,276,189
DIRECT CONTACT AIR TREATING APPARATUS
Filed Dec. 6, 1963
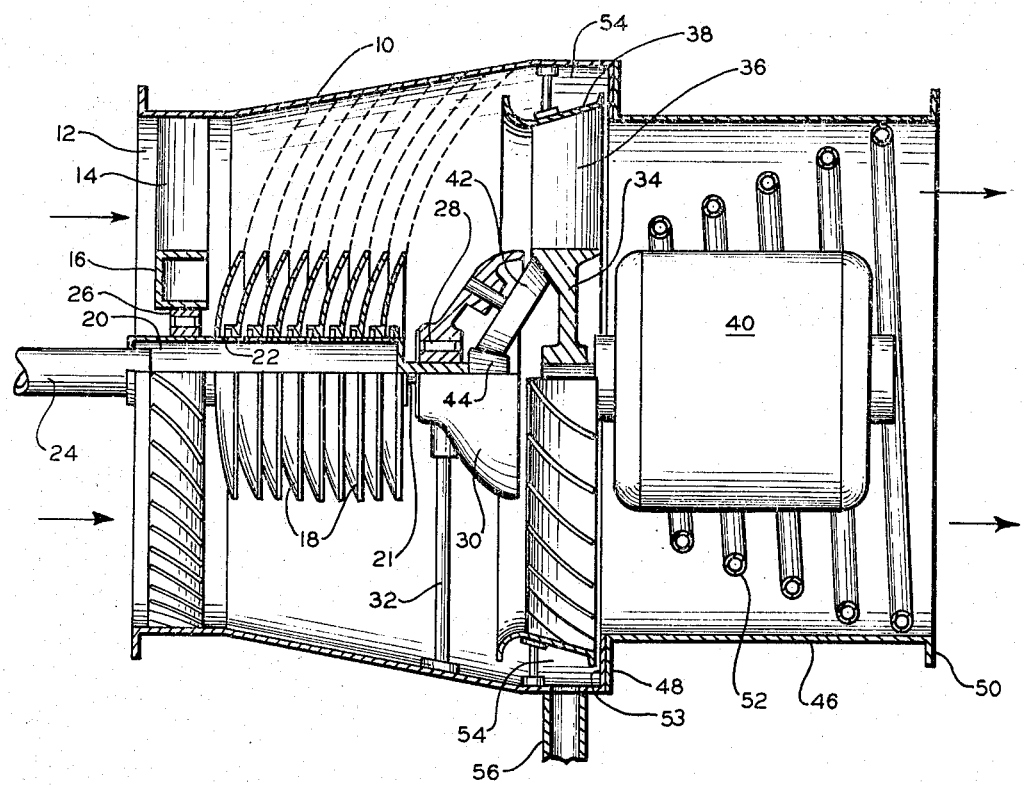
INVENTOR.
STIG G. SYLVAN
BY Edward C. Queny
ATTORNEY

United States Patent Office 3,276,189
Patented Oct. 4, 1966

3,276,189
DIRECT CONTACT AIR TREATING APPARATUS
Stig G. Sylvan, Louisville, Ky., assignor to American Air Filter Company, Inc., Louisville, Ky., a corporation of Delaware
Filed Dec. 6, 1963, Ser. No. 328,746
7 Claims. (Cl. 55—230)

This invention relates to apparatus for conditioning air by bringing it into direct contact with a treating fluid.

Apparatus according to the invention is primarily intended for use as a comfort air conditioning unit, and as such is capable of modifying the condition of the air by cooling or heating it, humidifying or dehumidifying it, cleaning it, and moving it.

The principal object of this invention is the provision of relatively simple apparatus for effectively utilizing the principles involved in direct contact heat exchange and fluid contact air cleaning.

A specific object is the provision of apparatus which functions in a manner that promotes relative movement between the treating fluid and the air to be contacted while the air is passing through the direct contact zone.

Another specific object is the provision of apparatus arranged so that the means creating air flow through the apparatus serves also as a fluid eliminator and air flow straightener.

The principles involved in the invention will be explained in the context of air being contacted by water, although it is to be understood that the principles of the invention are also applicable to apparatus in which a treating fluid other than water is used to contact air or some other gas. In exchanging heat between water droplets and air placed in direct contact with each other, the effectiveness of the transfer is generally proportional to the relative velocity of one to the other. Likewise the transfer of moisture to or from the air, and precipitation of dust from the air upon the water, requires relative movement between the air and water. To use an extreme example, exchange of heat and moisture between the water and the air, and precipitation of dust from the air, are at a minimum when the water has no velocity relative to the air.

If a sufficiently small droplet of water is simply released in a non-rotating air stream, the droplet will ultimately acquire the velocity of the stream and behave as if it were suspended in still air. Even if the droplet is forcefully projected into the non-rotating air stream, it will ultimately come to relative rest with the same result. However, a droplet placed in a rotating air stream tends to acquire a tangential velocity equal to the rotational component of the air velocity. As a result of the droplet's tangential velocity, the centrifugal force causes the droplet to move radially outwardly across the rotating air flow. Since the air which forms a rotating air stream does not move in a radial direction unless external forces are applied, but only moves in an axial direction, a relative velocity in at least a radial direction is maintained between the droplet having a tangential velocity and the rotating air.

Apparatus according to the invention insures that there will always be relative velocity between air and water by projecting droplets of water into a rotating air flow with an initial tangential velocity in the same direction as the direction of rotation of the air. With this arrangement, the droplets will always have a tangential velocity in the contact zone; hence the centrifugal force exerted on the droplets insures relative movement between the water and air. In contrast to my arrangement, relative movement is not necessarily maintained if the water droplet is projected into the rotating air flow with a tangential velocity in a direction opposite the direction of rotation of the air. In this latter case, the force of the rotating air opposes the direction of rotation of the droplet, and ultimately the tangential velocity of the droplet will decrease to zero before the droplet begins to rotate in the same direction as the direction of rotation of the air. At the point where the water droplet has no tangential velocity, its centrifugal force has also been reduced to zero and there is at this time no relative movement between the air and the water droplet.

Another result of projecting droplets into the air with a rotational component in opposition to the direction of rotation of the air is that the rotation of the air is tended to be slowed by the opposite rotation of the droplets. This result is avoided in accordance with my invention since the water droplets are projected into the rotating air flow with a tangential velocity directed in the same direction as the direction of rotation of the air flow.

It is common to provide direct contact apparatus with means for eliminating excess water from the air before it is passed to the space to be conditioned. In apparatus according to my invention the blower means which induces the air flow through the apparatus also serves to eliminate undesirably large droplets not previously removed from the air stream by contact with the casing wall. To accomplish this, I rotate the suction fan wheel, creating the air flow, in a direction opposite to the direction of rotation of both the air and water droplets upstream of the fan wheel. By virtue of this arrangement, the probability of water droplets passing through fan wheel is substantially reduced.

Thus considering the invention in one of its broader aspects, it may be said to reside in the provision of apparatus for direct contact air handling including: a fan means rotating in one direction to create air flow through a passage; means upstream from the fan means for imparting a whirl to the air in the opposite rotational direction; and means for projecting water droplets into the rotating air with a rotational velocity component in the same direction as the direction of rotation of the air.

An embodiment incorporating the principles of the invention is illustrated in the accompanying drawing which is a partly diagrammatic side view of air treating apparatus according to the invention with the portion of the casing facing the observer removed, and with part of the interior components of the direct contact air treating zone illustrated in half-section.

In the construction shown, the casing wrapper sheet 10 generally defines a circular passage of increasing cross-section for the flow of air to be treated. The air to be conditioned, flows in the direction indicated by the arrows and enters an annular inlet 12 in which is disposed a series of stationary twirler vanes 14 radiating outwardly from the hub structure 16 to the inner surface of the casing 10. The vanes impart a clockwise twirl (as viewed from the inlet end of the device) to the air.

Immediately downstream from the hub and twirler vanes, a series of axially spaced slinger discs 18 are mounted upon a rotatable hollow cylinder 20 extending along the axis of the air flow passage. Each disc 18 has an upstream convex face, and a downstream concave face. The straight line diameter of the discs is substantially equal to the diameter of the hub 16 so that the periphery of the hub and peripheries of the discs are aligned.

The hollow cylinder 20 is provided with a series of holes 22 therein adjacent the downstream face of each disc. Water is delivered to the interior of the cylinder through a supply pipe 24 received within the upstream end of the cylinder. The water is passed out through the holes 22 and distributed on the downstream concave faces of the discs by the rotation of the cylinder and discs. The water is forced outwardly to the periphery of the discs and is discharged therefrom in the form of small droplets into the air stream. To aid in controlling droplet size, the downstream faces of the discs may be provided with grooves or channels extending in generally radiating fashion to the disc peripheries.

The hollow cylinder 20 is supported for rotation at its upstream end from the inner diameter of the hub 16 through a roller bearing assembly 26. The downstream end of the cylinder 20 is closed and takes the form of a reduced diameter stub shaft 21 which is also supported for rotation by means of another roller bearing assembly 28. The bearing assembly 28 is mounted at the center of a stationary drive casing 30 supported from the outer wrapper sheet 10 by a series of radial legs 32. A friction drive arrangement is provided to effect a counter rotation of the hollow cylinder 20 relative to the rotation of the blower means now to be described.

The blower means illustrated comprises an axial type fan wheel having a hub 34 and radiating blades 36 coaxially mounted within the fan ring 38 supported from the casing wall. The drive power for all rotating parts in the apparatus is provided by an electric motor 40 connected to drive the fan wheel in one direction. Counter rotation of the hollow cylinder 20 is accomplished by means of the series of friction contact roller wheels 42 carried from the drive casing 30 and having diametrically opposite peripheral edge surfaces respectively contacting the fan hub 34 and a cone shaped cylinder drive element 44 directly connected to the stub shaft end 21 of the cylinder 20. Each of the roller train wheels 42 is carried by the drive casing 30 for rotational movement only, and it will be apparent that as the fan wheel hub 34 is driven in one direction of rotation, the roller train wheels will rotate in the same direction with the cylinder drive element 44 being rotated in the opposite direction.

The outlet duct section 46 is simply a cylindrical duct having an upstream flange 48 connected to the contact section 10, and a downstream flange 50 to which additional duct work may be connected. In accordance with capacity requirements of a particular installation, indirect contact heat exchange means 52 in the form of steam, hot water, or electrical heating coils may be optionally provided.

The annular space formed between the exterior of the fan ring 38 and the interior of the wrapper sheet 10 is designated 54 and serves as a collection chamber for water eliminated from the air stream. Water passes to the collection chamber 54 along the interior surface of the wrapper sheet 10 after being centrifuged, and is also thrown into the chamber by the fan blades. In this latter connection it will be noted that the downstream edge of the fan ring 38 is of slightly greater diameter than the diameter of the outlet duct 46 and the downstream edge of the ring is spaced slightly upstream from the inwardly projecting flange 53 at the outlet end of the casing 10. With this arrangement, the water intercepted by the fan blades 36 and carried radially outwardly by the rotation of the blades is susceptible to being discharged into the collection chamber through the annular gap between the downstream edge of the ring 38 and the flange 53. All of the water collected in the chamber 54 flows out through the drain pipe 56. In most cases it will be desirable that the water be recirculated and purified through an external circulation system (not shown) for economy purposes.

Preferably, and as shown, the twirler vane blades 14 are curved in transverse section and disposed so that their upstream faces present concave surfaces which impart a clockwise rotation (as viewed looking into the inlet end of the apparatus) to the entering air flow. The blades 36 of the fan wheel are also curved in section, but are disposed so that their upstream faces present convex surfaces, and their downstream faces (which advance in the counterclockwise direction of rotation of the wheel) are concave to favor retention of water intercepted by the blades while the water moves outwardly for discharge into the collection chamber.

As previously explained, the drive arrangement 30 causes a counter rotation of the hollow cylinder 20 and the cylinder mounted slinger discs 18 relative to the direction of rotation of the fan wheel so that the water droplets discharged into the air stream from the disc peripheries have a rotational velocity component directed in the same direction as the direction of rotation of the air stream in the contact section. The small droplets also have a component of velocity in a radially outward direction, and a component of velocity in an axial direction, i.e., in the direction of air movement through the apparatus as a whole. As a result, the droplets for the most part move outwardly and in a downstream and spiralling direction until they impinge upon the wrapper sheet 10. The droplets then pass along the wrapper sheet interior surface to the collection chamber 54 and, influenced by the continually rotating air stream, ultimately reach the drain pipe 56. The exact trajectory of any individual droplet in its travel between disc and impingement upon the wrapper is a function of a number of factors including, the size of the droplet, its initial velocity as it leaves the disc and, both the axial and angular velocity of the air passing through the contact section. The broken line trajectories shown in the drawing as extending from the discs to the wrapper sheet, do not include any tangential component of the trajectories.

Some of the water droplets thrown into the air by the slinger discs may fail to reach the wrapper sheet, or may re-enter the air flow after impaction against the wrapper sheet. These droplets are removed, for the most part, by the fan wheel rotating in a direction opposite to the direction of rotation of the air stream. The counter rotation of fan relative to air rotation in the contact section also serves to straighten the air flow before it passes into the outlet duct.

As previously noted, the apparatus may be applied to condition the air in various ways. When the device is to be used to cool air, chilled water is supplied to the rotating cylinder and discs at an entering temperature and rate in accordance with the volume of air handled to produce the desired cooling. Of course by providing water at a temperature lower than the wet bulb temperature of the entering air, dehumidification of the air will take place. When the device is to be used for heating purposes, the supply water is tempered to produce the desired specific humidity of the air and further heating may be produced with the indirect heat exchanger 52.

There is no need to provide any air filter on the air entering end of the apparatus since the air cleaning provided by the direct contact between the water droplets and the air will be of an order comparable to any filter normally considered practical in connection with such devices.

As shown, it is preferable that the cross-sectional area through which the air passes at the inlet and outlet of the direct contact section, and in the outlet duct, be substantially uniform to promote smooth air flow through the apparatus. Hence the axial alignment of vane hub 16, disc 18 peripheries, and fan hub 34.

While for the most applications an axial type fan wheel will develop adequate static air pressure for the intended service, where considerably higher pressures are required a tubular fan arrangement, or a centrifugal fan wheel with an appropriate scroll, may be used. In the latter case, the principles of particulate separation disclosed in my U.S. Patent 1,941,449 are equally applicable with respect to the counter rotation aspect taught herein.

The invention claimed is:

1. Direct contact air treating apparatus comprising:

(a) a casing having an air inlet end and an air outlet end defining a passage for air to be treated;

(b) fan means at the air outlet end of said casing for inducing air flow through said casing;

(c) means for rotating said fans means in one direction;

(d) means at the air inlet end of said casing for imparting rotation to entering air in a direction opposite to the direction of rotation of said fan means; and,
(e) means between said air inlet end and said fan means for projecting liquid droplets outwardly into the air stream with a rotational velocity component in the same direction as the direction of rotation imparted to said entering air.

2. Apparatus as specified in claim 1 wherein:
(a) annular liquid collection chamber means are provided in said casing adjacent the outlet of said casing and in encircling relation to said fan means;
(b) the diameter of at least a part of said casing increases in diameter in the direction of air flow through said casing;
(c) shoulder means project inwardly adjacent said outlet end of the casing to define an air outlet opening of lesser diameter than the outer diameter of the fan wheel of said fan means;
(d) said liquid projection means includes a series of discs spaced along the axis of said casing; and,
(e) means for rotating said discs in the same direction as the rotation of said entering air.

3. Direct contact air treating apparatus comprising:
(a) a generally open-ended tubular casing forming a passage for the flow of air to be treated and having an air inlet end and an air outlet end, said passage being circular in cross-section and having an enlarged diameter section adjacent its air outlet end;
(b) an axial-type fan comprising a fan wheel and encircling ring disposed in said enlarged diameter section, said ring forming the inner wall of a liquid collection chamber defined between said ring and said casing;
(c) means for rotating said fan wheel in one direction;
(d) vane means in said casing upstream from said fan for imparting rotation to the entering air in a direction opposite to the direction of rotation of said fan wheel;
(e) means between said fan wheel and said vane means for projecting liquid droplets outwardly into said rotating air with a rotational velocity component in the same direction as the direction of rotation imparted to said entering air.

4. Apparatus as specified in claim 3 wherein:
(a) said enlarged diameter section includes an inwardly projecting shoulder forming the downstream wall of said liquid collection chamber; and,
(b) said fan ring is spaced upstream from said shoulder to form an annular gap therewith for passage into said collection chamber of liquid discharged by said fan wheel.

5. Apparatus as specified in claim 3 wherein:
(a) said liquid projecting means comprises a rotatable, perforated, hollow cylinder extending along the axis of said casing and carrying a series of axially-spaced discs rotatable with said cylinder; and,
(b) means are provided for supplying said discs with liquid through said hollow cylinder.

6. Apparatus as specified in claim 5 wherein:
(a) means are provided to drive said hollow cylinder and discs from said fan wheel in a direction counter to the rotation of said fan wheel.

7. Apparatus as specified in claim 5 wherein:
(a) the inner edges of said vane means, the outer edges of said discs, and the inner edges of the blades of said fan wheel are substantially aligned as viewed in an axial direction through said casing.

References Cited by the Examiner

UNITED STATES PATENTS

| | | | |
|---|---|---|---|
| 1,480,775 | 11/1924 | Marien | 55—230 |
| 1,941,449 | 1/1934 | Sylvan | 55—407 |
| 2,252,982 | 8/1941 | Roberts | 55—230 X |
| 2,375,203 | 5/1945 | Appeldoorn | 55—396 X |
| 2,841,369 | 7/1958 | Carraway | 55—258 X |
| 2,921,646 | 1/1960 | Poole | 55—396 X |
| 3,205,641 | 9/1965 | Jamison et al. | 55—230 |

HARRY B. THORNTON, *Primary Examiner.*

RONALD R. WEAVER, *Examiner.*